United States Patent [19]
Darcie et al.

[11] Patent Number: 5,559,624
[45] Date of Patent: Sep. 24, 1996

[54] COMMUNICATION SYSTEM BASED ON REMOTE INTERROGATION OF TERMINAL EQUIPMENT

[75] Inventors: Thomas E. Darcie, Middletown; N. J. Frigo, Aberdeen; Peter D. Magill, Lakewood, all of N.J.

[73] Assignee: Lucent Technologies Inc., Murray Hill, N.J.

[21] Appl. No.: 333,926

[22] Filed: Nov. 3, 1994

Related U.S. Application Data

[63] Continuation of Ser. No. 29,724, Mar. 11, 1993.

[51] Int. Cl.$^6$ .................................................. H04B 10/20
[52] U.S. Cl. .......................... 359/125; 359/118; 359/120
[58] Field of Search ..................... 359/118, 119, 359/120, 125, 126, 157, 164, 167, 168, 169, 170, 171; 340/825.54

[56] References Cited

U.S. PATENT DOCUMENTS

| | | | |
|---|---|---|---|
| 3,752,908 | 8/1973 | Boenke et al. | 178/5.6 |
| 3,890,461 | 6/1975 | Vogelman et al. | 178/5.1 |
| 4,435,705 | 3/1984 | Stevens | 340/825.05 |
| 4,454,512 | 6/1984 | Millett | 343/12 |
| 4,730,301 | 3/1988 | McMahon | 359/119 |
| 4,787,693 | 11/1988 | Kogelnik et al. | 359/119 |
| 4,879,763 | 11/1989 | Wood | 455/607 |
| 4,922,481 | 5/1990 | Hicks | 370/4 |
| 4,946,244 | 8/1990 | Schembri | 359/157 |
| 5,010,543 | 4/1991 | Hill | 370/3 |
| 5,058,101 | 10/1991 | Albanese et al. | 359/157 |
| 5,109,286 | 4/1992 | West, Jr. et al. | 358/349 |
| 5,189,544 | 2/1993 | Sailer | 359/153 |
| 5,212,577 | 5/1993 | Nakamura et al. | 359/124 |
| 5,221,983 | 6/1993 | Wagner | 359/125 |
| 5,225,902 | 7/1993 | McMullan, Jr. | 358/86 |
| 5,285,305 | 2/1994 | Cohen et al. | 359/137 |
| 5,295,012 | 3/1994 | Wilson et al. | 359/135 |
| 5,343,240 | 8/1994 | Yu | 348/14 |

FOREIGN PATENT DOCUMENTS

| | | | |
|---|---|---|---|
| 62-53033 | 7/1987 | Japan | 359/121 |
| 62-53032 | 7/1987 | Japan | 359/121 |

OTHER PUBLICATIONS

G. Nicholson, Use of a Fibre Loop Reflector As Downstream Receiver and Upstream Modulator in Passive Optical Network, Electronics Letters, 7 Jun. 1990, vol. 26, No. 12, pp. 827–828.

H. Kobrinski and S. S. Cheng, Laser Power Sharing In the Subscriber Loop, Electronics Letters, 27 Aug. 1987, vol. 23, No. 18, pp. 943–944.

B. Glance, U. Koren, C. A. Burns and J. D. Evankow, Discretely–Tuned N–Frequency Laser for Packet Switching Applications Based on WDM. Electronics Letters, 18 Jul. 1991, vol. 27, No. 15, pp. 1381–1383.

(List continued on next page.)

*Primary Examiner*—Hezron E. Williams
*Assistant Examiner*—Richard A. Moller
*Attorney, Agent, or Firm*—Henry T. Brendzel; Joseph J. Opalach

[57] ABSTRACT

A passive optical network architecture is disclosed for application in a local loop telephone environment. A local digital switch transmits an optical signal bearing information downstream over an optical fiber to the terminal equipment of a group of subscribers. This transmitted optical signal comprises light at a number of different wavelengths, i.e., it is a wavelength-division multiplexed signal, where each subscriber is associated with a particular wavelength of light. Each subscriber's terminal equipment detects that portion of the transmitted optical signal that exists at its assigned wavelength and thereby recovers the information sent by the local digital switch for that subscriber. However, a fraction of this detected optical signal is then remodulated by the subscriber's equipment with the subscriber's upstream information and returned to the local digital switch. As a result, no optical sources exist in the subscriber equipment in this optical network architecture.

38 Claims, 8 Drawing Sheets

OTHER PUBLICATIONS

D. A. Chapman, MSc, MIEE and D. W. Faulkner, PhD, MIEE, Use of Reflected Light for Low Data Rate Upstream Signalling in a Single Mode Passive Optical Network, IEE Proceedings, vol. 137, Pt. J. No. 2, pp. 108–114 Apr. (1990) e.g., see heading No. 8, p. 111.

J. R. Stern, J. W. Ballance, D. W. Faulkner, S. Hornung and D. B. Payne, Passive Optical Local Networks for Telephony Applications and Beyond, Electronics Letters, 19 Nov. 1987, vol. 23 No. 24, pp. 1255–1257.

Kevin W. Lu, Member of IEEE, Martin I. Eiger, Member IEEE and Howard L. Lemberg, Member IEEE, System and Cost Analyses of Broad–Band Fiber Loop Architectures, IEEE Journal on Selected Areas in Communications, vol. 8, No. 6, Aug. 1990, pp. 1058–1067.

Yih–Kang Maurice Lin, Member, IEEE, and Dan R. Spears, Member, IEEE, Passive Optical Subscriber Loops With Multiaccess, Journal of Lightwave Technology, vol. 7, No. 11, Nov. 1989, pp. 1769–1777.

R. C. Menendez, S. S. Wagner and H. L. Lemberg, Passive Fibre–Loop Architecture Providing Both Switched and Broadcase Transport, Electronic Letters, 1 Mar. 1990, vol. 26, No. 5, pp. 273–274.

C. Dragone, An N X N Optical Multiplexer Using a Planar Arrangement of Two Star Couplers, IEEE Photonics Techology Letters, vol. 3, No. 9, Sep. 1991, pp. 812–815.

C. Dragone, C. A. Edwards and R. C. Kistler, Integrated Optics NxN Multiplexer on Silicon, IEEE Photonics Technology Letters, vol. 3 No. 10, Oct. 1991, pp. 896–899.

COMMUNICATION SYSTEM BASED ON REMOTE INTERROGATION OF TERMINAL EQUIPMENT

This application is a continuation of application Ser. No. 07/029,724, filed on Mar. 11, 1993.

BACKGROUND OF THE INVENTION

The present invention relates to passive optical communications networks.

In the past ten years optical transmission systems have more and more taken over the functions of their copper counterparts in the trunk network and between central offices. However, replacement of copper based transmission in the trunk network by optical fiber based transmission is only the first step in the utilization of the large transmission capabilities of optical fibers. Indeed, deployment of optical fibers may ultimately penetrate further to the local loop plant to bring broad-band and narrow-band services directly to telephone subscribers.

Currently, one area of investigation in optical loop plants involves the use of a passive optical network (PON) in which there are no active components between a central office and the subscriber's terminal equipment. In particular, a feeder fiber from the central office provides a downstream optical signal to a remote node (RN) that splits the optical signal for distribution onto a number of optical fibers, each one of which terminates in an Optical Network Unit (ONU). The latter converts the received optical signal into electrical form and delivers it to either one or a number of subscribers. Generally speaking, there are currently two popular PON architectures under consideration for deploying optical fibers into the local loop—"Telephony over Passive Optical Networks" (TPON) and "Passive Photonic Loop" (PPL).

In a TPON architecture, the central office provides a downstream optical signal to each of the ONUs utilizing a time-division multiplexed protocol. This protocol typically comprises a frame of information that is further subdivided into time slots that are assigned to individual ONUs. Upon receiving the time-division multiplexed optical signal, each ONU then extracts the information that is contained in its assigned time slots. Consequently, each ONU must be synchronized to the transmission of the downstream optical signal to ensure that it correctly performs the demultiplexing operation. Similarly, in the upstream direction, from each ONU to the central office (through the RN), the operation of the ONU's laser must be synchronized so that each ONU transmits information only in its assigned time slot so as to avoid interfering with the optical signals provided by the lasers of other ONUs. This synchronization in the upstream direction is further complicated by the effect of the different optical path lengths, between each ONU and the RN, on an ONU's respective optical signal.

In comparison, the PPL architecture is different from the TPON architecture in that at the central office each ONU is assigned a unique wavelength, which forms the basis for segregation and routing in the downstream direction. The central office forms an optical signal for downstream transmission by "wavelength division multiplexing" the light output from a number of lasers, where each laser provides light at one of the assigned wavelengths. This wavelength division multiplexed optical signal is received by the RN where it is demultiplexed into individual optical signals, where each individual optical signal is then routed to its associated ONU. In the upstream direction, there are two variations of this PPL architecture. In the first variation, each ONU comprises a laser that transmits a light signal at its respective assigned wavelength, similar to the transmission in the downstream direction. In the second variation, instead of providing a laser with a unique wavelength to each ONU, each ONU comprises a laser in a common wavelength band. Consequently, in this second variation, transmission in the upstream direction is similar to the TPON approach described above in which synchronization of each ONU's laser is required along with a time-division multiple access protocol.

As described above, both the TPON and PPL architectures require an optical source in the ONU for transmission of information in the upstream direction to the central office. As a result, each of these optical networks must be able to control the timing and/or wavelength accuracy of the ONU's optical sources. Consequently, supervisory and timing functions reside in both the central office and in the ONU thereby increasing network vulnerability to faults and resulting in added equipment and maintenance expenses.

SUMMARY OF THE INVENTION

In accordance with the invention, a class of passive optical network architectures is disclosed that eliminates the requirement for each ONU to have its own separate light source. In this new network architecture, ONU receiver units are addressed by wavelength and a portion of the light that is received by an ONU from the central office is re-used, i.e., re-modulated to carry information back to the central office.

In an embodiment of the invention, the central office transmits an optical signal, which is modulated with downstream information, to a subscriber's ONU over a wavelength-division multiplexed network. A fraction of this downstream optical signal is detected in the ONU for recovery of the downstream information and the remainder is remodulated with the ONU's upstream information and returned to the central office. In other words, the central office effectively interrogates each ONU with the downstream optical signal, which causes each ONU to transmit its upstream information.

One feature of the invention allows the use of a time-division multiplexing protocol that is decoupled from, or independent of, the ONU. As a result, the ONU does not have to have any predefined information about the time-division multiplexing protocol. This increases the flexibility of the central office to allocate system resources like bandwidth. By increasing the number of lasers at the CO, the system bandwidth can be gracefully and systematically improved to meet future demands, evolving from one laser serving N ONUs to N lasers serving N ONUs.

Another feature of the invention allows the use of subcarrier modulation of the transmitted optical signal to mitigate the effects of optical path delay on the upstream optical signal and to permit routing of signals at the ONU and the central office.

The elimination of an optical source from the ONU provides a number of enhanced maintenance benefits. For example, there is no need to register or stabilize an ONU laser's wavelength because there is no ONU laser. Since the light source for the ONU is located at the central office—it is already stabilized. As a result, network vulnerability and expense is greatly reduced since all supervisory and timing functions reside solely within the central office and it maintains theoretical efficiency of a wavelength-division multiplexed system. In addition, the invention allows the central office to perform enhanced fault detection. For example, in the embodiment described above, there is effectively an unbroken optical circuit from the laser of the central office to an optical receiver of the central office. This provides the central office with access to the entire optical loop.

DETAILED DESCRIPTION

Figure 1:
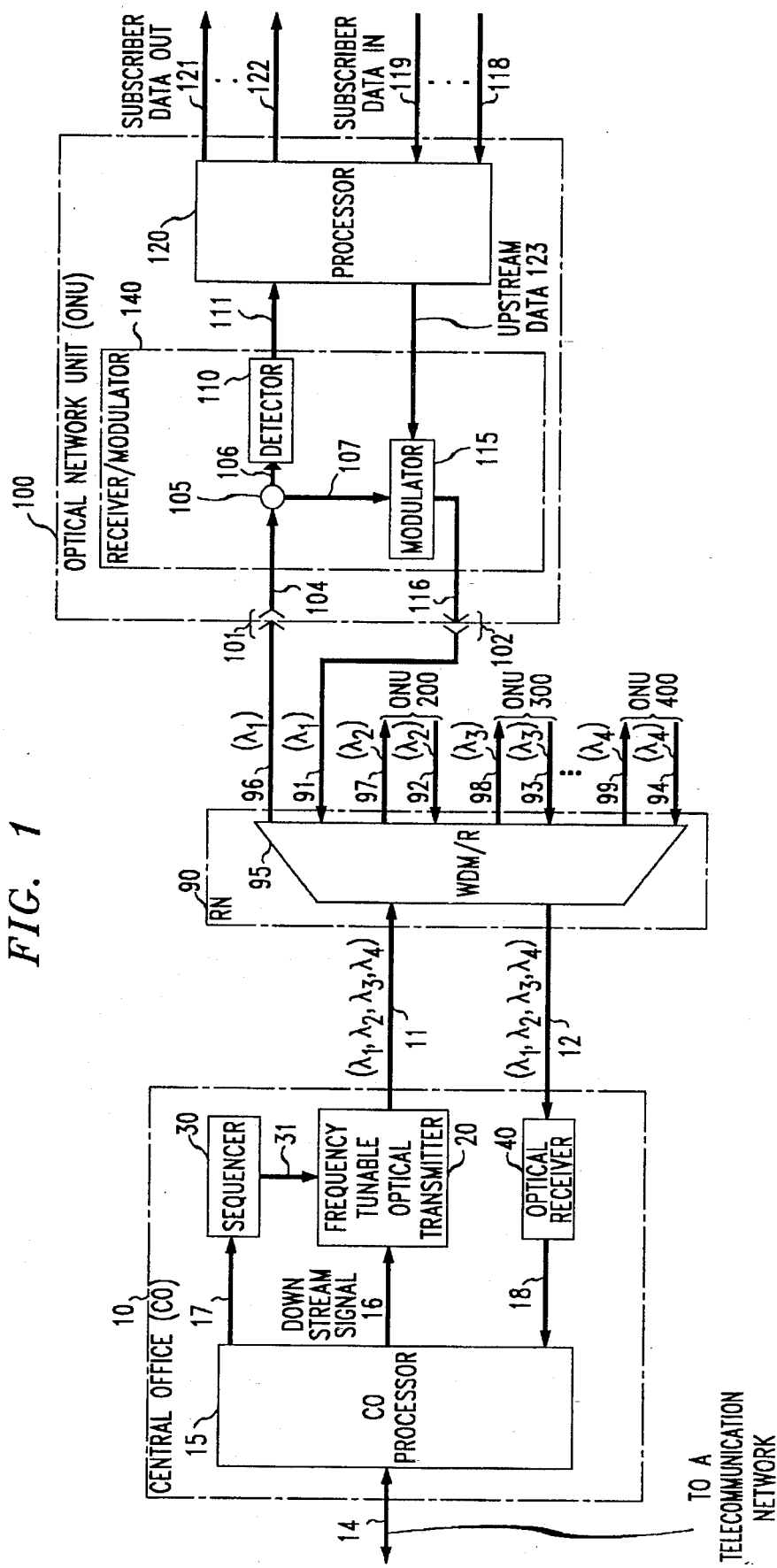
FIG. 1 is a block diagram of a passive optical communications system in accordance with the principles of the invention.

The block diagram of FIG. 1 shows an optical fiber communications network in accordance with the principles of the invention. This optical local loop comprises a local digital switch, or hub, i.e., central office (CO) 10; RN 90; and a number of distant terminals, or ONUs, represented by ONU 100, ONU 200, ONU and ONU 400. It is assumed for the purposes of this example that all of the ONUs, or endpoints, are essentially identical in design although each ONU may have different capabilities. Therefore only ONU 100 is shown in detail. In general, CO provides a downstream optical signal over optical fiber 11 to RN 90, which is representative of one of a number of remote nodes that are optically coupled to CO 10. Within RN 90 this downstream optical signal is split and then provided to the ONUs, e.g., to ONU 100 via optical fiber 96, etc. As shown in FIG. 1, each ONU may provide service to a number of subscribers, or customers, by multiplexing or demultiplexing respective signals. However, for the purposes of this description it is assumed there is one subscriber per ONU, which is represented by subscriber data out 121 and data in 119. Turning now to the upstream direction, RN 90 receives an optical signal over an optical fiber from each ONU, e.g., optical fiber 91 from ONU 100, etc. RN 90 then combines the optical signals from each ONU and provides a single upstream optical signal to CO 10 over optical fiber 12.

Except for the inventive concept described below, it is assumed CO 10 functions as in the prior art (and in future advanced delivery systems) in providing voice services and data services, e.g., video, etc., to each of the subscribers associated with each ONU. For example, CO 10 is able to provide a digital equivalent of plain old telephone service (POTS) between a called party, e.g., the subscriber associated with ONU 100, and a calling party, which might access CO 10 over facility 14. The latter is representative of any number of facilities, e.g., an inter-office trunk, that couples CO 10 to a telecommunications network (not shown). Similarly, the data services can range from providing a simple data connection between terminal equipment of the subscriber associated with ONU 100 and a computer system (not shown), or the provisioning of video or multimedia services to a subscriber associated with ONU 100.

Figures 2, 3:
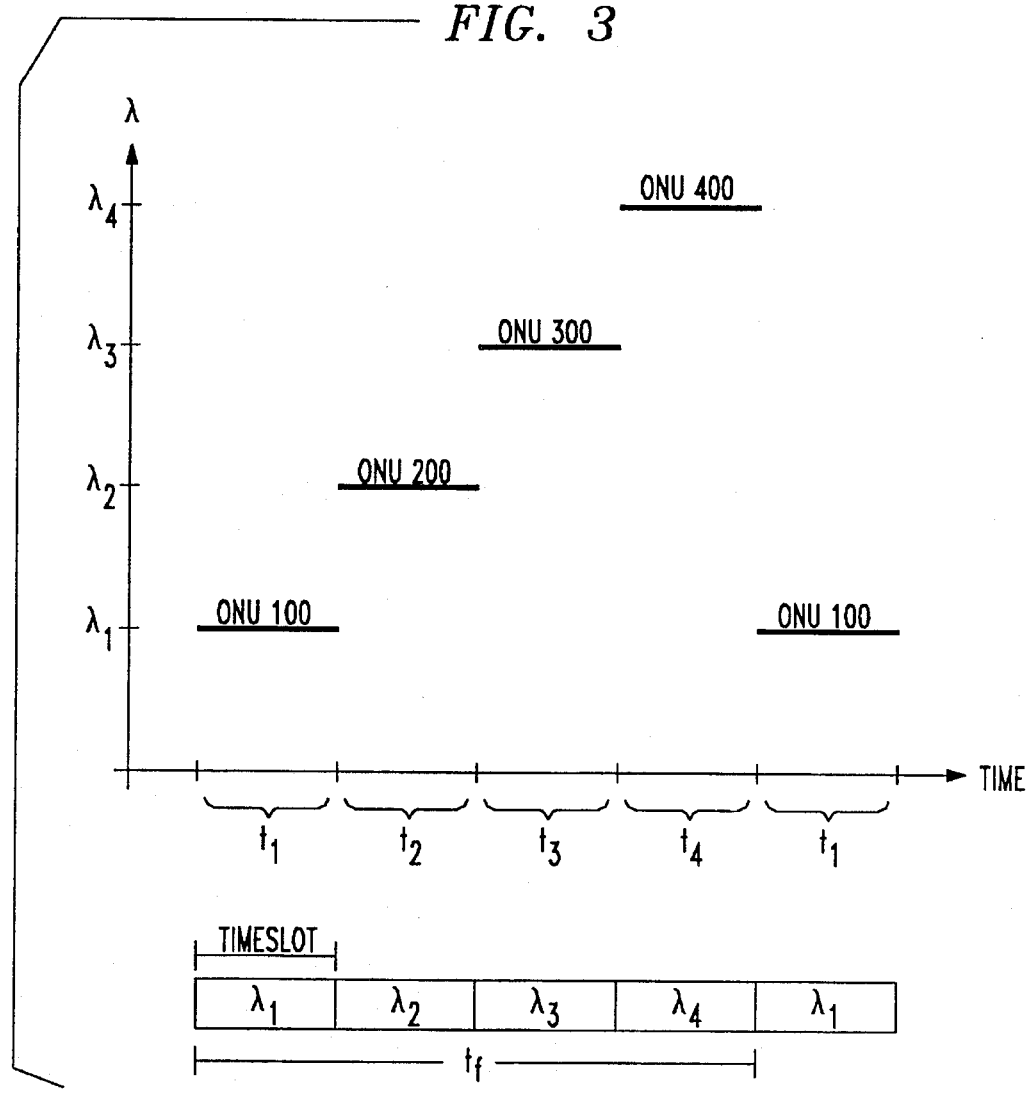
FIG. 2 is a table showing a representative assignment of optical wavelengths to each ONU of FIG. 1.
FIG. 3 shows a graphical representation of an illustrative staircase sequencing of the distinct optical wavelengths for use in sequencer 30 of FIG. 1.

As shown in FIG. 1, CO 10 comprises CO processor 15, frequency tunable optical transmitter 20, sequencer 30 and optical receiver 40. CO processor 15 provides a downstream signal via path 16. It is assumed that this downstream signal is a digitally encoded representation of information for each of the ONUs, e.g., a sequence of binary "ones" and "zeros." This digitally encoded information includes representation of voice signals, video signals, signaling, etc. Frequency tunable optical transmitter 20 comprises a "frequency tunable laser," which is similar in function to that described in "Discretely Tuned N-Frequency Laser for Packet Switching Applications Based on WDM," B. Glance et al., Electron. Lett., vol. 27, pp. 1381–1383, 1991. In particular, frequency tunable optical transmitter 20 is capable of providing essentially single mode operation at a number of different optical wavelengths. Each ONU that is optically coupled to RN 90 is associated with one of these optical wavelengths as shown in FIG. 2 in a manner consistent with the operation of RN 90 (discussed below). In other words, information that is associated with the subscriber associated with ONU 100 is transmitted by optical transmitter 20 via an optical signal with a wavelength of $\lambda_1$. Although it is assumed for the purposes of this example that only one wavelength, e.g. $\lambda_1$, is used per ONU, a "set," e.g. $\lambda_{1j}$, or collection, of wavelengths can be similarly defined for each ONU. For example, this would allow associating different services or different subscribers with different wavelengths. Similarly, information destined for ONU 200 is carried by an optical signal with a wavelength of $\lambda_2$. CO processor 15 synchronizes both the application of the respective ONU information to optical transmitter 20 via path 16, and the selection of the particular wavelength via path 17, which applies a control signal to sequencer 30. The latter stores the ONU wavelength assignments shown in FIG. 2. As a result of this synchronization, CO processor 15 formats the downstream optical signal so that it is representative of a time-segmented wavelength-division multiplexed signal, an example of which is shown in FIG. 3. This particular time-division multiplexed signal comprises a time frame, $t_f$, which comprises a number of time slots, $t_i$, where each time slot is associated with a particular wavelength. In this particular example, each time slot is used to transmit a "packet" of information to the respective ONU although other effective techniques (like bit interleaving) can also be used. CO processor 15 controls sequencer 30 via path 17 so that sequencer 30 repetitively steps through the wavelengths $\lambda_1$, $\lambda_2$, etc., for each time slot. For example, during time slot $t_1$, CO processor 15 provides information associated with ONU 100 to frequency tunable optical transmitter 20. At the same time, sequencer 30 controls frequency tunable optical transmitter 20 so that it is transmitting an optical signal having a wavelength of $\lambda_1$. As a result, frequency tunable optical transmitter 20 impresses information for ONU 100 onto an optical signal with a wavelength of $\lambda_1$. Packets (or bits) for the other ONUs are similarly transmitted in the other time slots at their respective different wavelengths. This results in a downstream optical beam comprising a number of optical signals each at a different wavelength and modulated by a downstream information signal.

Figure 4:
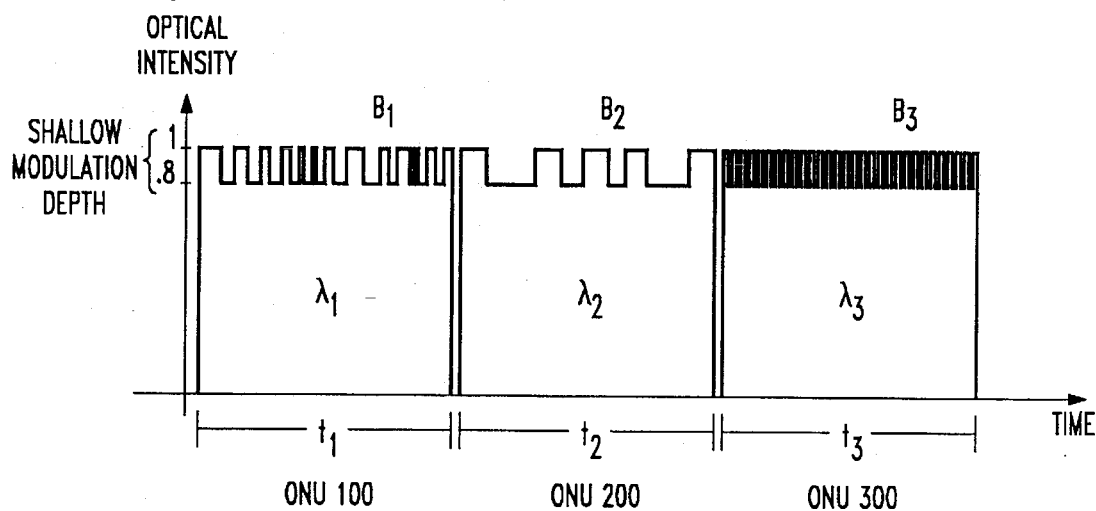
FIG. 4 is a graphical representation of the transmitted optical signal of CO 10 of FIG. 1.

Although other modulation techniques are possible, frequency tunable optical transmitter 20 illustratively uses intensity modulation as the modulation technique for impressing the respective ONU information onto its optical signal. One possible representation of this is shown in FIG. 4 for the downstream optical signal applied to optical fiber 11. As mentioned above, the downstream signal provided by path 16 represents digitally encoded sequence of "ones" and "zeros." In this example, frequency tunable optical transmitter 20 assigns a "one" to a normalized optical power of 1.0, while a "zero" is assigned to a lower optical power level, e.g., 0.8. This is known as a "shallow modulation depth." A representative transmitted digital sequence is shown in FIG. 4 for time slots $t_1$ to $t_3$. It should be noted that the modulation rate, i.e., the number of bits per second, B, transmitted in each time slot can also vary for each ONU as can the format (multilevel etc.). This is also shown in FIG. 4, where the modulation rate $B_2$ for ONU 200 during time slot 12 is lower than the modulation rates $B_1$ and $B_3$ for respective ONUs 100 and ONU 300. Similarly, the modulation rate for ONU 300, $B_3$, is higher than the modulation rate for either ONU 100 or ONU 200.

The transmitted optical signal from CO 10 is accepted by RN 90. The latter in this example comprises wavelength division multiplexer/router (WDM/R) 95. An example of a WDM/R is disclosed in "An N×N Optical Multiplexer Using a Planar arrangement of Two Star Couplers," C. Dragone, IEEE Phot. Technol. Lett., vol. 3, pp. 812–815, 1991; and in "Integrated Optics N×N Multiplexer on Silicon," C. Dragone, C. A. Edwards, and R. C. Kistler, IEEE Phot. Technol. Lett., vol. 3, pp. 896–899, 1991. As discussed above, the incident optical light applied to WDM/R 95, via optical fiber 11, is a wavelength division multiplexed optical signal that comprises a number of wavelengths. One of the properties of WDM/R 95 is that it routes light as a function of its wavelength and input port to a particular output port and vice versa. For example, light at a wavelength of $\lambda_1$ applied via optical fiber 11 is routed to optical fiber 96 for transmission to ONU 100. Similarly, light of a wavelength $\lambda_2$ is routed to the port of WDM/R 95 that is coupled to optical fiber 97, etc. In other words, WDM/R 95 addresses each ONU by wavelength. In addition, WDM/R 95 has linearity and reciprocity properties that allow all the light paths to be reversed. For example, light with $\lambda_1$ could be applied to WDM/R 95 via optical fiber 96 and it would be routed to optical fiber 11. However, since in some applications it is advantageous to separate the upstream and downstream optical signals, WDM/R 95 differs from standard WDMs in that it can be configured to comprise a second set of ports for upstream transmission as represented by optical fibers 91 through 94 and 12. Light comprising appropriate discrete wavelengths applied to WDM/R 95 via optical fibers 91 through 94 is routed to optical fiber 12 for transmission to CO 10 thereby creating an upstream wavelength division multiplexed signal. In this way, the WDM/R 95 serves as both a demultiplexer and a wavelength-matched multiplexer, and thereby provides the ability to merge and sort optical signals based on their optical frequency. Although this is an N×N device, only 2×N of the ports are used in this particular example. More advanced networks (e.g., inter-office networks, etc.) can be implemented by using more of the "input" ports.

As described above, WDM/R 95 separates the wavelength-division multiplexed signal applied via optical fiber 11 and routes each optical signal comprising a discrete wavelength to a particular optical fiber for downstream transmission to an ONU, e.g., via optical fiber 96 to ONU 100. In this illustrative implementation, ONU 100 accepts the light with receiver/modulator 140. The latter comprises passive tap coupler 105 (which could also be a switch), detector 110, and modulator 115. Passive tap coupler 105 splits the incident light into two signals of differing intensity levels for application to optical paths 106 and 107. In particular, a "low intensity" optical signal is applied to optical path 106 while a "high intensity" optical signal is applied to optical path 107. The low intensity optical signal is illustratively 20% of the received light from RN 90, and the high intensity optical signal comprises the remaining 80% of the received light from RN 90. Optical path 106 applies the low intensity optical signal to optical detector 110, where the optical signal is detected and converted to an electrical signal on path 111. The electrical signal on path 111 represents that portion of the downstream information transmitted by CO 10 for ONU 100. Path 111 provides this electrical signal to processor 120, which further conditions and processes the signal to provide a subscriber "data out" signal representative of the respective downstream information, via path 121.

Figure 5:
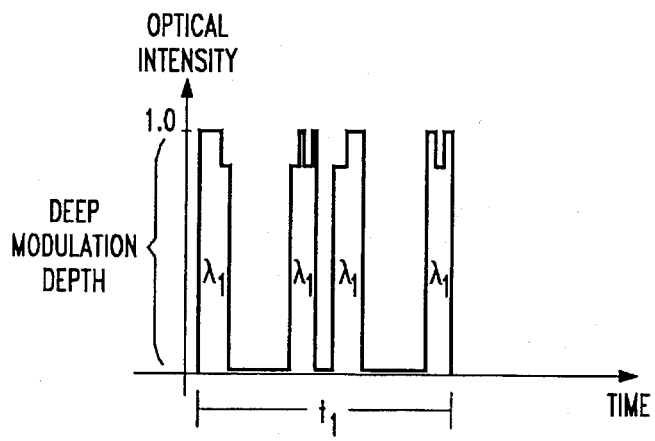
FIG. 5 is a graphical representation of the transmitted optical signal of ONU 100.

In accordance with the principles of this invention, the remaining portion of incoming light to ONU 100 enters a "loopback" to CO 10, and begins its journey when it is directed by passive tap coupler 105 to optical modulator 115, which performs intensity modulation of any upstream information. As in CO 10, it is assumed processor 120 receives a subscriber "data in" signal that represents subscriber information via path 119 and provides a digitally encoded upstream signal that is representative of this information via path 123. This upstream information is released by processor 120 at the appropriate moment as determined by the presence of a signal on path 111. The optical signal supplied by optical path 107 forms an optical carrier for the upstream information. In this example, optical modulator 115 intensity modulates this optical carrier with the upstream information with a "deep modulation depth." This is shown in FIG. 5 for a representative upstream digital sequence transmitted during time slot $t_1$. It can be observed from FIG. 5 that the downstream optical signal effectively samples modulator 115 to provide the upstream optical signal. This upstream optical signal provided by optical modulator 115 illustratively varies between normalized intensity levels 1.0 and 0.8, representing a "one", and ≈0, representing a "zero." Similar to the description above for the downstream optical signal, it should be noted that the modulation rate, i.e., the number of bits per second, B, transmitted in the upstream direction in each time slot can also vary for each ONU. An upstream optical signal is conveyed through optical modulator 115 to RN 90 via optical path 116, port 102, and optical fiber 91. In addition, it should be noted that processor 120 can also be responsive to identification information included within the downstream signal or can add identification information to the upstream signal that identifies either ONU 100 or a subscriber.

Figure 6:
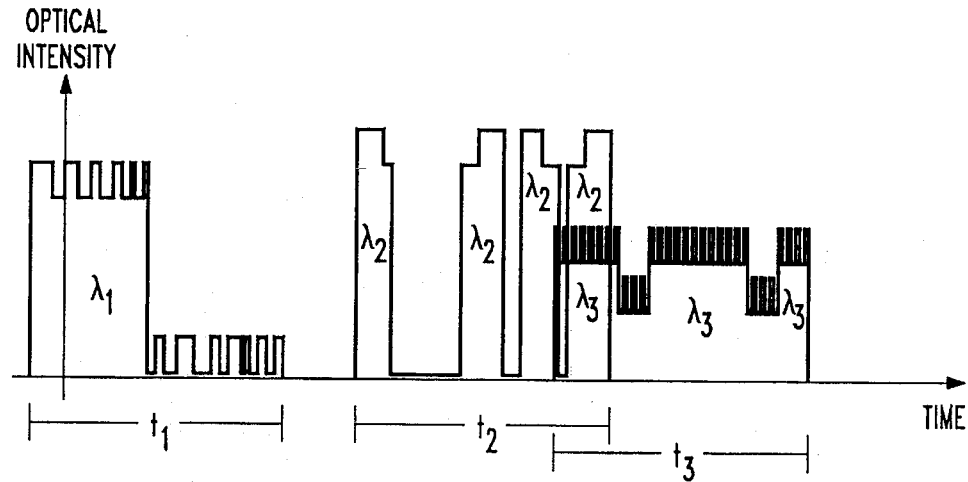
FIG. 6 is a graphical representation of the transmitted optical signal of RN 90.

As mentioned earlier, RN 90 accepts the upstream optical signal from each of the ONUs and wavelength-division multiplexes them, via WDM/R 95, to provide a wavelength division multiplexer optical signal to CO 10 via optical fiber 12. An illustrative wavelength division multiplexer optical signal is shown in FIG. 6. Optical receiver 40, of CO 10 detects the upstream optical signal and converts it to a representative electrical signal, which is applied to CO processor 15 via path 18. Ignoring for the moment the possible occurrence of packet or bit collisions at optical receiver 40, CO processor 15 processes the electrical signal to sort and route each of the individual upstream subscriber information to its appropriate destination.

Since the optical fibers from each ONU to RN 90 will probably differ in optical path length, FIG. 6 also illustrates the effect of a different optical path length on the upstream optical signals of ONU 100, ONU 200 and ONU 300 when a packet format is used. As shown in FIG. 6, the received upstream optical signals from ONU 200 and ONU 300 have been shifted by different amounts of time (compared to ONU 100) due to differing optical path lengths and may as a result now overlap in time. This overlap results in packet collisions at optical receiver 40 of CO 10. These packet collisions can be avoided in any number of ways.

Figure 7:
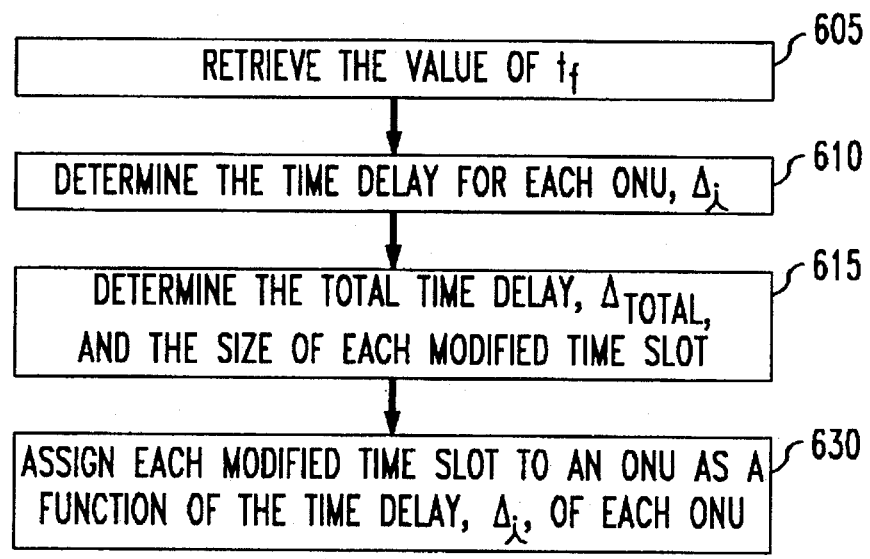
FIG. 7 is representative method for compensating for different optical path lengths for each ONU in the optical communications system of FIG. 1.

One method for avoiding these packet collisions is for CO processor 15 to take into account the various time delays before transmission of any downstream information. An illustrative method is shown in FIG. 7. Beginning with step 605, it is assumed that the length of a time frame, $t_f$, is known a priori. In this example, it is assumed that $t_f=125$ μsec (e.g., SONET). As described above, during each frame a packet of downstream information is transmitted to each ONU. As a result, the size of each time slot is simply equal to $t_f/N$, where N is the number of ONUs. For example, if ONU 100, ONU 200, ONU 300 and ONU 400 are representative of 16 ONUs, this results in 16 packets of information for each time frame, each packet being transmitted in a time slot of approximately 8 μsec. each. In step 610, CO processor 15 determines the optical path length, or time delay, $\Delta_i$, for each of the 16 ONUs before any downstream transmission of subscriber information takes place. This time delay is determined by using any number of known ranging techniques. In step 615, the total time delay, $\Delta_{total}$, is determined by the physical length of the network. It is assumed that the physical length of the network of FIG. 1 is similar to that of a TPON network, which is 3.6 kilometers. This results in a value for $\Delta_{total}$ of approximately 35 μsec. From this total time delay, a modified frame is created by allowing for a period of dead time in each time frame, where the dead time is equal to $\Delta_{total}$. Continuing with this example, if $\Delta_{total}=35$ μsec., the length of time for the modified frame, $t_{mf}$, is equal to:

$$t_{mf}=t_f-\Delta_{total}=125 \text{ μsec.}-35 \text{ μsec.}=90 \text{ μsec.} \qquad (2).$$

Figure 8:
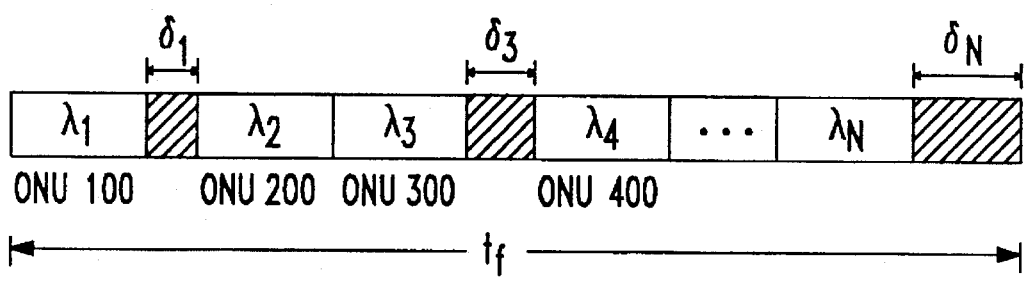
FIG. 8 is a representation of a received time frame comprising a number of guard-bands for use in the optical communications system of FIG. 1.

CO processor 15 then determines in step 615 the size of each modified time slot, which is equal to $t_{mf}/N$. For N=16, each packet of information is now compressed into a time slot with a duration of 5.62 μsec. In step 630, CO processor 15 assigns each modified time slot to an ONU as a function of its time delay, $\Delta_i$, with the closest ONU being associated with the first modified time slot. In the case of equidistant ONUs, they are selected in any order. CO processor 15 then sequentially transmits each ONU's information in its associated time slot as described above. As a result of compressing the time frame and ordering the assignment of time slob to ONUs in order of increasing optical path lengths from RN 90, the time frame comprising the upstream information will appear to CO processor 15 as shown in FIG. 8. As represented in FIG. 8, it is assumed that ONU 100 is closest, ONUs 200 and 300 are equidistant, followed by ONU 400.

It can be observed from FIG. 8 that delay times, $\delta_i$, are distributed throughout this received time frame. Each deal time, $\delta_i$ is equal to the difference between the end of one packet and the start of another. For example, $\delta_1$ is equal to time between the end of packet 1 and the arrival of packet 2. Consequently, the returning optical signal will effectively have dead time between each of the packets, where the sum total of the dead time is limited by $\Delta_{total}$. It should be noted that this technique does introduce inefficiency into the system as a result of the allowance for dead time in each time frame.

Figure 9:
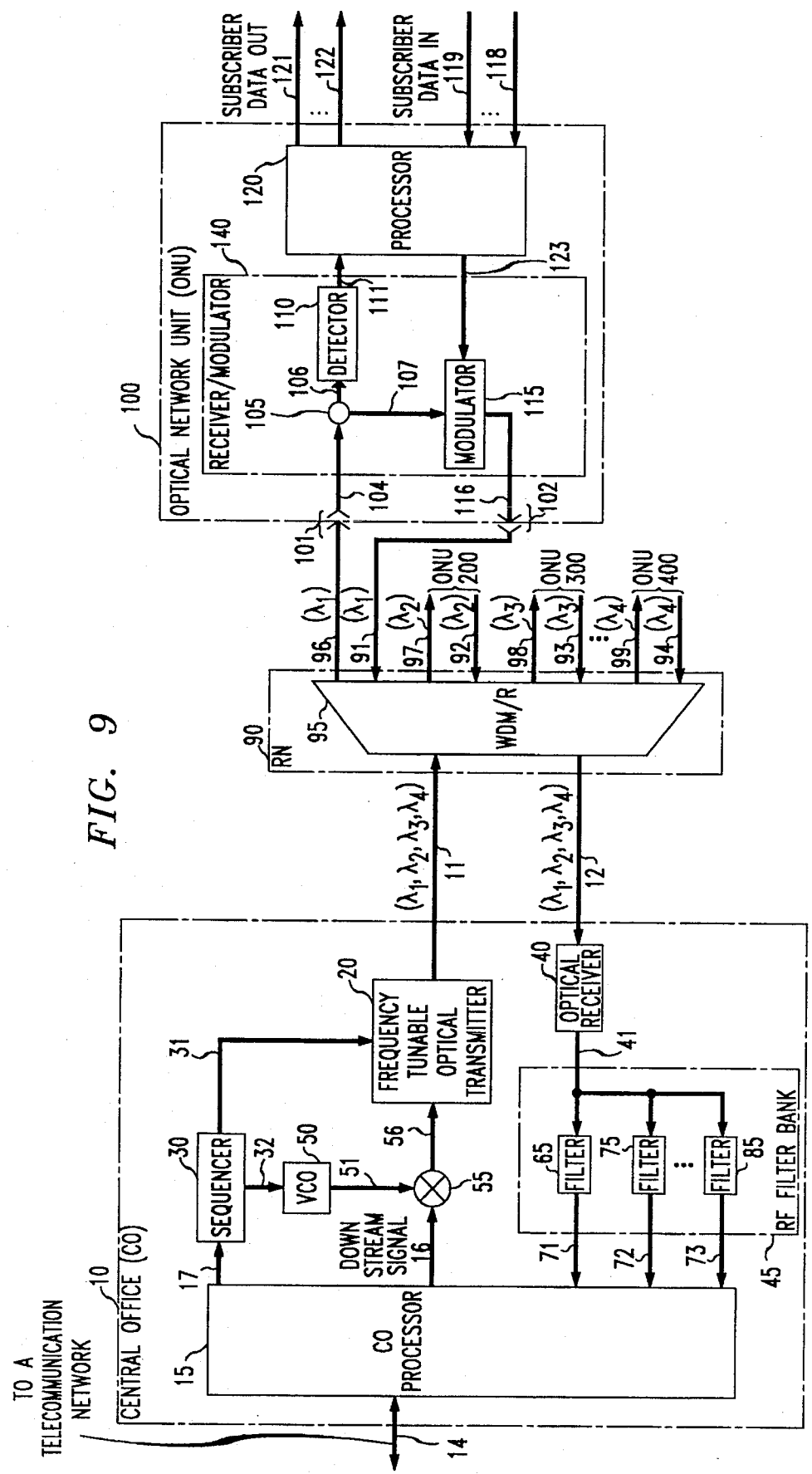
FIG. 9 is another embodiment of the invention employing sub-carrier modulation in the central office of FIG. I.

Another approach to avoiding packet collisions is to subcarrier modulate the packets in each time frame. This is shown in FIG. 9. The only differences between FIG. 1 and FIG. 9 are voltage controlled oscillator (VCO) 50, multiplier 55, and RF filter bank 45 of CO 10. The downstream signal on path 16 is sub-carrier modulated by multiplier 55 at one of a number of frequencies, $f_i$, where each frequency is uniquely associated to an ONU in a similar fashion to the assignment of wavelengths. In other words, the downstream signal is shifted from a base-band frequency to a radio-frequency (RF) band centered around $f_i$. At the same time that sequencer 30 signals frequency tunable optical transmitter 20 to change the optical transmitter's wavelength, sequencer 30 changes the frequency of VCO 50. Consequently, the frequency tunable optical transmitter 20 modulates its light output with an RF burst at each particular frequency, $f_i$. The amplitude of each RF burst represents "ones" and "zeroes" in a manner similar to the "baseband" description of FIG. 1. The transmission of the downstream optical signal and the operation of RN 90 and ONU 100 is as described above for FIG. 1.

After making the round-trip through its respective ONU, the received optical signal is detected by optical receiver 40, which provides on path 41 an electrical signal that comprises a plurality of modulated RF bursts at different frequencies. This electrical signal is provided to RF filter bank 45, which comprises a number of RF filters equal to the number of frequency settings of VCO 50 selected by sequencer 30. Each particular RF filter provides an output only when an RF frequency is present in the electrical signal at the output of optical receiver 40 that is within the RF filter's passband. The output of each RF filter is applied to CO processor 15. The net effect is that a single optical receiver at the central office now looks like a bank of dedicated WDM receivers— but for a cheaper cost. This further provides routing flexibility to the central office. For example, a simple change in ONU subcarder assignment effectively switches the received ONU upstream data from one output path, e.g., path 71, to another, e.g., path 73, without any knowledge required by the particular ONU or subscriber. Similarly, it can be used to code different information streams to the ONUs. These can be used to implement the same type of function as a time slot interchanger in a TDM system.

From the above descriptions of the inventive concept, it should be noted that while it is essential that an ONU have "some" time slot in a time frame, the details about which time slot is being used is irrelevant to any particular ONU. In other words, since an ONU does not transmit until it detects an optical signal, the ONU does not have to have any a priori knowledge about the time-division multiplexing protocol used by a central office. As a result, the time-division multiplexing format, both in terms of amount of time dedicated to an ONU and the sequence of transmission by the central office to an ONU, can be varied in any fashion without requiring a change to the ONU equipment. This results in no synchronization requirement between CO 10 and an ONU, and allows CO 10 to provide "bandwidth on demand". For example, in CO 10, the disposition of the duration of time slob in each time frame can be handled upon demand at call setup to satisfy the need for extra bandwidth. If ONU 100 signals a need for extra bandwidth and ONU 200 is not busy, the length of time that the central office's laser transmits at the wavelength associated with ONU 100 can be doubled by using the time slot assigned to ONU 200. This kind of reassignment of slots does not require recomputation and reconfiguration of any network synchronization scheme and all of the ONUs are unaware that anything has happened.

Figure 10:
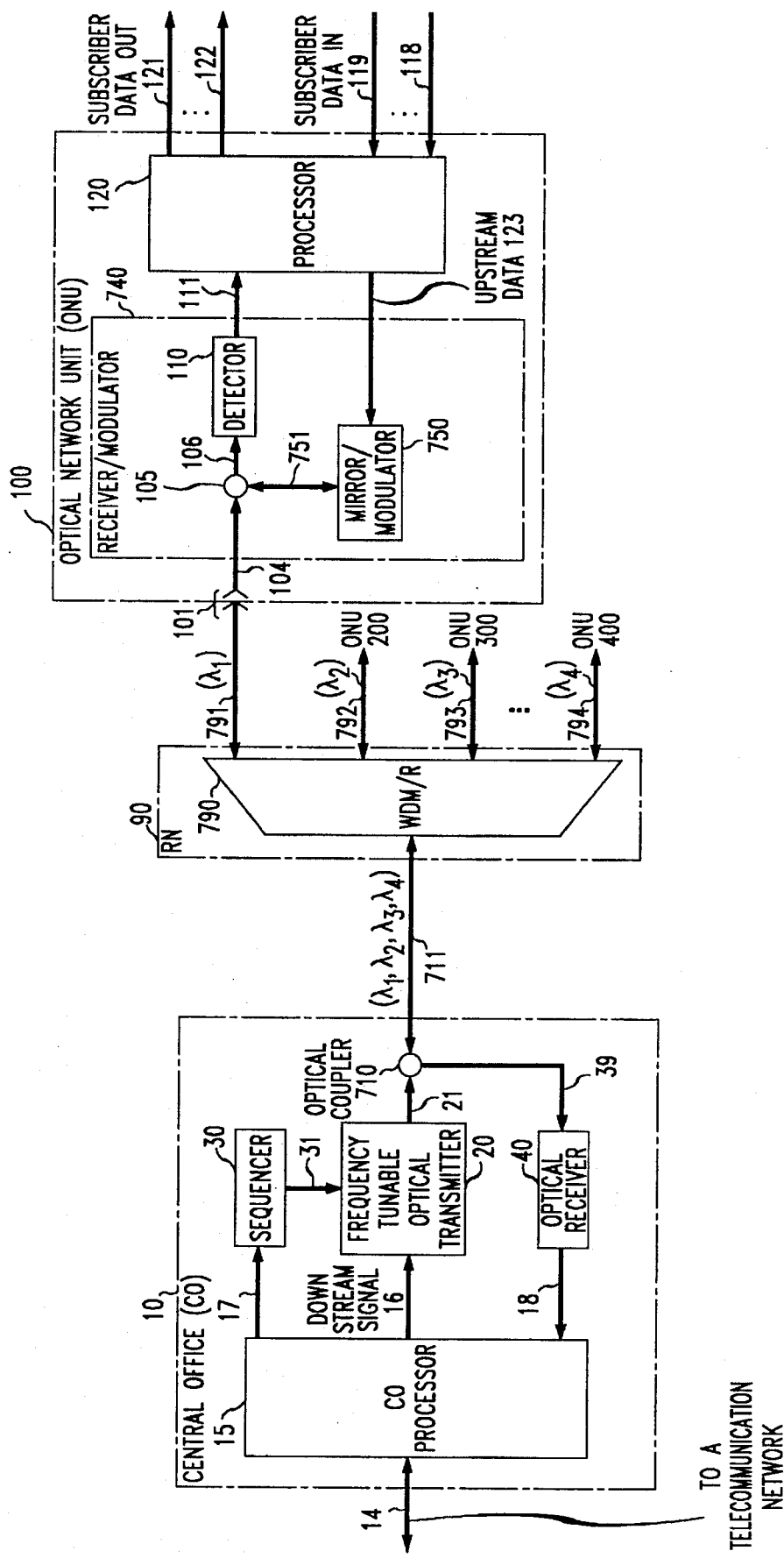
FIG. 10 is another embodiment of the invention showing a single fiber architecture including a mirror/modulator.

Another embodiment of the inventive concept is shown in FIG. 10, which shows a single fiber architecture. In this architecture, optical fibers 711, 791, 792, 793 and 794 are bi-directional. The operation of CO 10, RN 90, and ONU 100 is as described above in reference to FIG. 1 except for the following differences. In this single fiber architecture, CO 10 also comprises optical coupler 7 10, which, in the downstream direction, applies the optical signal from frequency tunable optical transmitter 20 to optical fiber 711 and, in the upstream direction, applies the upstream optical signal to optical receiver 40. The downstream optical signal that is carried by optical fiber 711 is applied to RN 90, which routes the incident light as a function of its wavelength to bi-directional optical fibers 791,792,793, and 794, each of which is received by ONUs 100, 200, 300 and 400, respectively. Since this is a single fiber architecture, optical modulator 115 of ONU 100 of FIG. 1 is replaced by optical mirror/modulator 750, which not only performs a "deep modulation" of a portion of the downstream optical signal as described above, but also reflects the downstream optical signal back towards CO 10, thereby providing the upstream optical signal to optical fiber 791. This upstream optical signal is wavelength division multiplexed with the other tipstream optical signals from ONUs 200, 300 and 400 as a result of the reciprocity property of WDM/R 790 described above. This upstream wavelength division multiplexed optical is applied to optical receiver 40 of CO 10 via optical fiber 711 and optical coupler 710. It should be realized that in general as is known in the art coupler 105 is really a four port device, where one of the ports is not used. However, this unused port could be used to couple the upstream reflected light to an upstream optical fiber.

Figure 11:
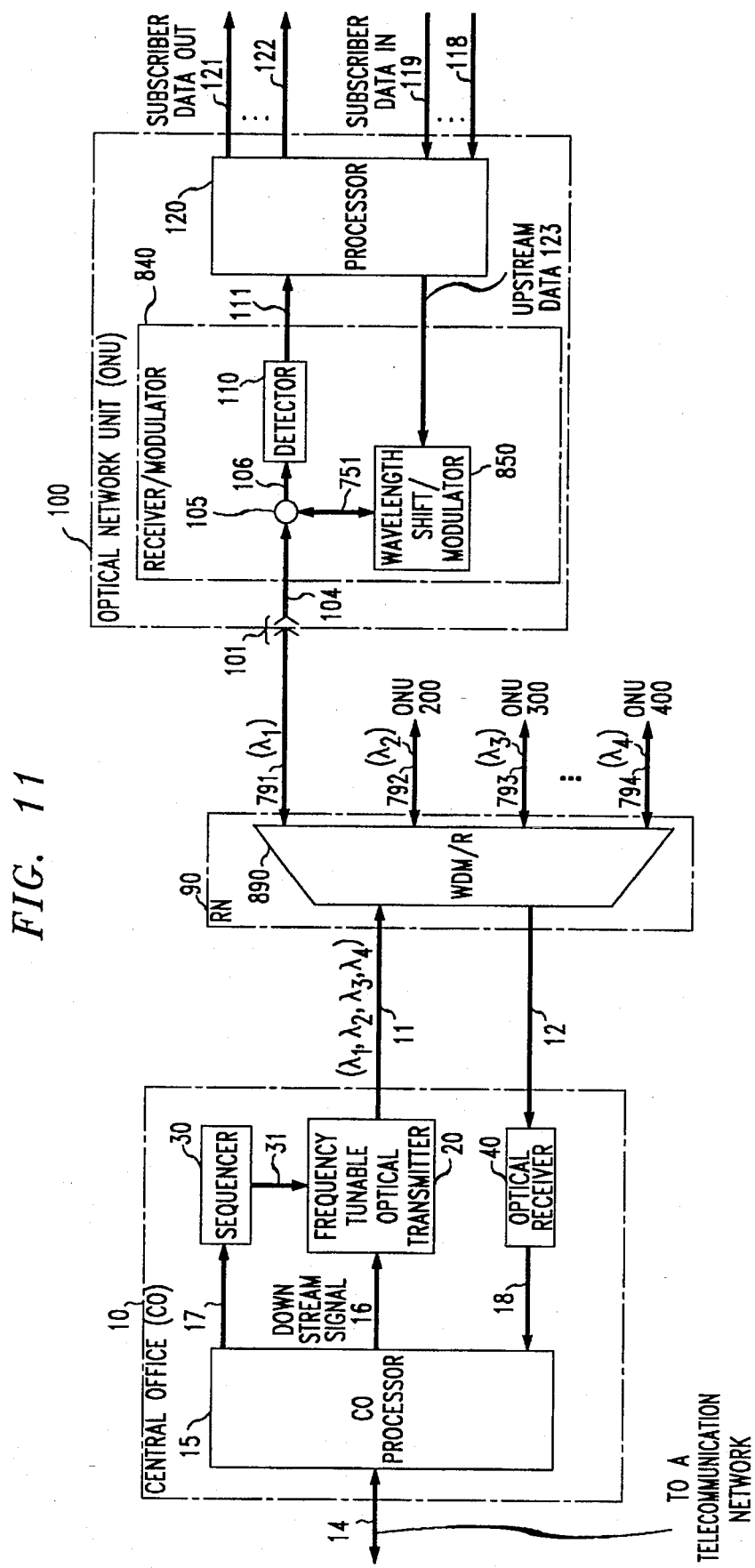
FIG. 11 is another embodiment of the invention showing a single fiber architecture including a wavelength shifter.

A potentially severe problem in a single fiber architecture is that of back-scattered light. One possible solution is the use of a wavelength shifter in the ONU, and an additional optical fiber between the RN and the central office. This is shown in FIG. 11, where mirror/modulator 750 of FIG. 10 is replaced by wavelength shifter/modulator 850, optical coupler 710 of FIG. 10 is removed, and upstream optical fiber 12 couples RN 90 to CO 10 as described above. Wavelength shifter/modulator 850 provides a different light signal at a different wavelength, $\lambda_1 + \Delta\lambda$. This different light signal is then transmitted over bi-directional optical fiber 791 back to RN 90, which then routes the reflected light to CO 10 over optical fiber 12 via WDM/R 890. The use of wavelength shifter/modulator 850 and the additional optical fiber between RN 90 and CO 10 helps to avoid back-scatter associated with the downstream optical signal.

Figure 12:
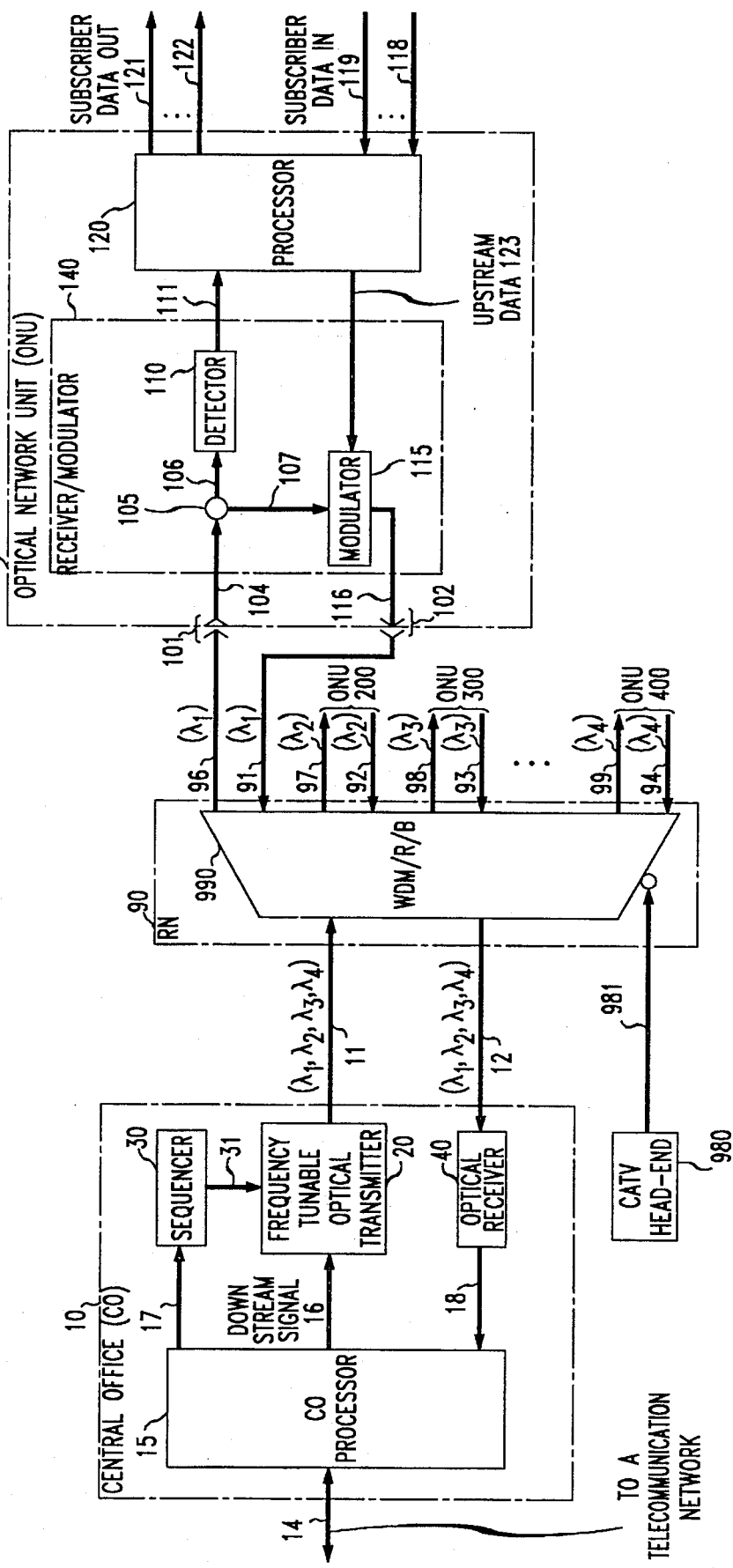
FIG. 12 is another embodiment of the invention showing a broadcast mode of operation.

Finally, FIG. 12 shows another embodiment of the inventive concept that includes a broadcast mode of operation. The only difference between FIG. 1 and FIG. 12 is WDM/R/B 990 and CATV Head-End 980 which is illustrative of a source of broadcast information. The latter provides a signal to WDM/R/B 990 via path 981. This signal is broadcast to all ONUs by WDM/R/B 990, which incorporates a broadcast function. In particular, the signal is essentially equally distributed by WDM/R/B 990 to each ONU. An example of a WDM/R/B is shown in the copending, commonly assigned, U.S. patent application of L. G. Cohen, entitled "Passive Optical Communications Network With Broadband Signals," Ser. No. 07/806561 filed on Mar. 25, 1992.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., sequencer 30, etc., the functions of any one or more of those building blocks can be carried out using one or more appropriate programmed processors. Further elements can be integrated together to provide the discrete functionality described above, e.g., receiver/modulator 140 can be an integrated device that would also remove the necessity to have splitter 105. In addition, elements from each of the Figures can be combined, e.g., sub-carrier modulation can also be used in the optical networks shown in FIGS. 9, 10, 11, and 12; there can be one or two fibers from the CO to the RN; within the RN, a WDM, WDM/R, or WDM/RJB or similar device can be used; there can be one or two fibers from the RN to the ONU; the terminal equipment can loopback the signal or reflect it, and SCM can be used in the upstream and/or downstream direction.

The inventive concept provides a number of enhanced maintenance benefits. For example, in the area of optical time domain reflectometry (OTDR), an OTDR system located in CO 10 can test the optical loop including the ONU equipment by generating light at different wavelengths, which is then routed by the WDM/R to the respective ONU. Using the WDM/R properties non-instrusive monitoring can be performed. In addition, since the downstream optical signal is eventually returned to CO 10, the latter is intrinsically monitoring the system status.

Also, sub-carrier modulation allows additional switching to be performed in the ONU by simply performing slight variations of the subcarrier frequency. This allows, in the downstream direction, routing information to be passed to processor 120 by changing the subcarrier frequency slightly while remaining in the respective appropriate passband in RF filter bank 45.

There can also be variations in the optical network through the use of WDM/R like devices. For example, a WDM or WDM/R can be used within CO 10 to demultiplex the upstream combined optical signal into a number of separate optical detectors to also mitigate the effect of packet collisions and increase total throughput. In addition, a filtering device such as a WDM, dichroic mirror, or a WDM/R can be used in an ONU to further route information to various terminal endpoints. In this mode, the periodicity property of the WDM/R, as disclosed in the above-mentioned prior art concerning N×N Optical Multiplexers, allows the WDM/R of the RN to perform a "coarse" routing function by directing optical signals comprising a "set" of wavelengths to a particular ONU. This ONU, via its own filtering device, then performs a "line" routing function by further demultiplexing the downstream optical signal into each individual wavelength from the set.

Further, instead of a single tunable transmitter at CO10, a multiplicity of sources (such as individual lasers) at the central office can be used to provide optical signals at the wavelength sets of each ONU. This removes inefficiency in the time domain. Also, modulation techniques other than intensity modulation can be used: format differences such as modulation frequency, coding, etc.; method differences such as amplitude modulation, frequency shift-keying, etc.; and time differences such as "ping-pong," where a pan of a time-frame is dedicated to upstream and a part to downstream information. For example, FIG. 6 shows a multi-level QAM signal associated with time-slot three. Nor, does the ONU have to remodulate the downstream optical signal with a different modulation format. For example, the ONU can process the downstream optical signal to remove the downstream modulation format and then remodulate the downstream optical signal in any manner including the downstream modulation format.

Finally, although illustrated in the context of an optical local loop, the inventive concept is also applicable to other applications of optical networks like inter-office networks, and can also be used in conjunction with mobile or cellular telecommunications systems.

We claim:

1. Apparatus including an input port and an output port, responsive to an information bearing optical input signal arriving at the input port, comprising:

a splitter responsive to the optical input signal for splitting the optical input signal into a first and a second signal, where the second signal carries at least some of the information borne by the optical input signal;

a receiver responsive to the first signal for detecting information contained in the first signal; and frequency shifting modulation means responsive to said second signal for modulating the second signal with an applied upstream signal to provide thereby a return signal to the output port.

2. The apparatus of claim 1 wherein the frequency shifting modulation means shifts the frequency of the second signal prior to modulation of the second signal with the upstream signal.

3. The apparatus of claim 1 wherein the frequency shifting modulation means modulates the second signal with the upstream signal by way of frequency shifting.

4. The apparatus of claim 1 where the input signal has essentially a single wavelength.

5. The apparatus of claim 1 wherein the input port and the output port are a single physical port of the apparatus.

6. Apparatus including an input port and an output port responsive to an information-bearing input signal arriving at the input port, comprising:

first means coupled to said input port for a) forming a received signal and a carrier signal, where the carrier signal comprises a portion of the information-bearing input signal and contains at least some of the information borne by the information-bearing input signal, and b) modulating the carrier signal with an applied upstream signal to form a modulated return signal; and second means for delivering the return signal to the output port.

7. The apparatus of claim 6 wherein the carrier signal is an attenuated replica of the information-bearing input signal.

8. The apparatus of claim 6 wherein the carrier signal is a selected time portion of the information-bearing input signal.

9. The apparatus of claim 4 wherein the carrier signal is a selected frequency sub-band of the information-bearing input signal.

10. The apparatus of claim 4 wherein the carrier signal is a preselected wavelength of the information-bearing input signal.

11. The apparatus of claim 6 where the input signal has essentially a single wavelength.

12. Apparatus responsive to an optical information-bearing input signal comprising:

a splitter responsive to the information-bearing input signal for forming a received signal and a carrier signal, where the carrier signal carries at least some of the information borne by the input signal; and a modulator, including a first port for receiving an applied upstream signal and a second port for receiving the carrier signal, for a) modulating the carrier signal with the upstream signal to form a modulated return signal, and b) applying the modulated return signal to thee second port, 13. The apparatus of claim 12 wherein said modulator is a reflective means for modulating.

14. The apparatus of claim 12, further comprising processing means interposed between the applied upstream signal and the modulator, for incorporating source-identification information into the upstream signal.

15. The apparatus of claim 12, further comprising processing means responsive to the received signal for detecting identification data in the received signal.

16. The apparatus of claim 15 wherein the identification data is data that identifies a destination apparatus.

17. A system comprising:

a plurality of units, each unit including a) a splitter for receiving an applied optical information-bearing unit input signal to form a received signal and a carrier signal that contains at least some of the information borne by said information-bearing input signal, and b) a modulator for modulating the carrier signal with an applied upstream signal to form a modulated return signal and to output the return signal from the unit: and a wavelength division multiplexer/demultiplexer coupled to said plurality of units responsive to a composite incoming signal for a) forming a plurality of information-bearing unit input signals and distributing said unit input signals to the plurality of units, and b) accepting the return signals of the plurality of units and forming a composite return signal from the accepted return signals.

18. The apparatus of claim 17, wherein at least some of the units are such that each unit further comprises a processing means, interposed between the upstream signal and the modulator, for incorporating source-identification information into each unit's upstream signals.

19. The system of claim 17 where each of the plurality of unit input signals formed by the wavelength division multiplexer/demultiplexer includes a different sub-band of the incoming signal.

20. The system of claim 17 where each of the plurality of unit input signals formed by the wavelength division multiplexer/demultiplexer includes a different sub-band of the incoming signal and a portion of a broadcast signal.

21. The system of claim 17, further comprising a hub that includes an optical signal source which develops the composite incoming signal, where the source is dedicated to the wavelength division multiplexer/demultiplexer.

22. The system of claim 17, further comprising a hub coupled to the wavelength division multiplexer/demultiplexer and providing said composite incoming signal where the hub includes means for forming said composite incoming signal from individual signals which occupy different bands.

23. The apparatus of claim 22, wherein at least some of the units further comprise processing means interposed between the upstream signals and modulators to which the upstream signals are applied, for incorporating source-identification information into the units' upstream signals.

24. The apparatus of claim 22, wherein at least some of the units further comprise processing means responsive to the units' received signals for detecting identification information in the received signals.

25. The system of claim 22 wherein the hub further includes a receiver responsive to the composite return signal.

26. The system of claim 25 wherein the receiver included in the hub comprises a wavelength division demultiplexer that develops a plurality of hub-receiver demultiplexer outputs, the hub further comprising a plurality of subreceivers connected to the hub-receiver demultiplexer outputs.

27. The system of claim 25 wherein the receiver included in the hub is sensitive to identification information contained in the composite return signal.

28. The system of claim 22 wherein the hub further includes a tunable oscillator for cooperating with applied data signals to form said individual signals which occupy different bands.

29. The system of claim 22 wherein the hub further includes a plurality of oscillators for cooperating with applied data signals to form said individual signals which occupy different bands.

30. The system of claim 22 wherein the hub further includes a plurality of oscillators, repetitively activated for preselected time intervals, for cooperating with applied data signals to form said individual signals which occupy different bands.

31. The system of claim 22 wherein at least some of the signals that combine to form the composite incoming signal are modulated signals.

32. The system of claim 31 wherein each of the modulated signals is a signal comprising a subcarrier that is modulated by an information signal.

33. The system of claim 31 wherein at least one of the upstream signals is itself a composite of signals.

34. A system comprising:
hub means for enabling transmission of an upstream information signal from a subscriber to the hub means by outputting a downstream light signal packet that carries information, when information is to be communicated to said subscriber;
a router coupled to the hub means for routing the light signal packet to one of a plurality of output ports of the router based on the wavelength of the signal packet's wavelength:
terminal means coupled to one of the output ports of the router for
a) receiving the light signal packet,
b) extracting a portion of the light signal packet, which portion contains at least some of the information carried by said light signal packet, and
c) modulating said portion with an upstream signal to develop thereby the upstream information signal; and means for delivering said upstream information signal to said hub.

35. A system comprising:
a multi-wavelength optical source for providing a wavelength division multiplexed signal;
a router coupled to the multi-wavelength optical source for receiving the wavelength division multiplexed signal and for providing a plurality of information-bearing unit signals from the received wavelength division multiplexed signal, where the unit signals have wavelengths that are essentially mutually exclusive; and
a plurality of terminal units coupled to the router, each including means for receiving one of the information-bearing unit signals and for modulating a portion of the received information-bearing unit signal with an upstream signal to thereby form a modulated return signal, where said portion carries at least some of the information carried by the received information-bearing unit signal.

36. The system of claim 35 wherein the multi-wavelength optical source emits laser radiation for a plurality of the terminal units simultaneously.

37. System apparatus comprising:
optical means for providing an optical wavelength division multiplexed downstream signal, at least one wavelength of which is modulated with downstream information;
a router, responsive to the downstream signal, for directing different wavelengths of the downstream signal to different output ports of the router; and
a plurality of units, each coupled to one of the output ports of the router and including means for receiving a unit signal from the coupled output port of the router and modulating a portion of the received unit signal with an upstream signal to thereby a remodulated return signal, where said portion of the received unit signal carries at least some of the information carried by the received information-bearing unit signal.

38. A communication apparatus including a first communication unit that develops an information-bearing optical signal when there is downstream information to be sent to the second unit, a second communication unit, and means for sending information between the first communication unit and the second communication unit, where the second communication unit includes a) means for splitting the optical signal arriving from the first communication unit into a first portion signal and a second portion signal, b) means responsive to the first portion signal for detecting the downstream information arriving from the first communication unit, and c) means for modulating the second portion signal with upstream information to develop thereby a modulated return optical signal and sending the modulated optical return signal to said first communication unit, the improvement characterized by:
the means for splitting is an optical device where the first portion signal is an attenuated replica of the second portion output signal.

* * * * *